US008861522B2

(12) United States Patent
Wang

(10) Patent No.: US 8,861,522 B2
(45) Date of Patent: *Oct. 14, 2014

(54) METHOD FOR PROVIDING AN INTERNAL SERVER WITH REDUCED IP ADDRESSES

(75) Inventor: Ning Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 384 days.

This patent is subject to a terminal disclaimer.

(21) Appl. No.: 12/038,451

(22) Filed: Feb. 27, 2008

(65) Prior Publication Data

US 2008/0175252 A1    Jul. 24, 2008

Related U.S. Application Data

(63) Continuation-in-part of application No. 10/420,208, filed on Apr. 22, 2003, now Pat. No. 7,362,760.

(30) Foreign Application Priority Data

May 15, 2002    (CN) .................................. 02 1 16797

(51) Int. Cl.
*H04L 12/28*    (2006.01)
*H04L 29/12*    (2006.01)

(52) U.S. Cl.
CPC ........ *H04L 61/2517* (2013.01); *H04L 61/2567* (2013.01); *H04L 29/12509* (2013.01); *H04L 29/12377* (2013.01)
USPC ........................... 370/392; 370/401; 709/249

(58) Field of Classification Search
None
See application file for complete search history.

(56) References Cited

U.S. PATENT DOCUMENTS

| 6,128,664 | A  | * | 10/2000 | Yanagidate et al. ...... 709/228 |
| 6,457,061 | B1 |   | 9/2002  | Bal et al. |
| 6,535,511 | B1 | * | 3/2003  | Rao .............................. 370/392 |
| 6,567,405 | B1 |   | 5/2003  | Borella et al. |
| 6,697,354 | B1 |   | 2/2004  | Borella et al. |
| 7,362,760 | B2 | * | 4/2008  | Wang ............................ 370/392 |
| 2002/0024959 | A1 | * | 2/2002  | Kong ............................ 370/401 |
| 2002/0129165 | A1 | * | 9/2002  | Dingsor et al. ............... 709/246 |
| 2003/0007486 | A1 | * | 1/2003  | March et al. .................. 370/389 |
| 2003/0088787 | A1 |   | 5/2003  | Egevang |
| 2004/0252683 | A1 |   | 12/2004 | Kennedy et al. |

OTHER PUBLICATIONS

Lee et al., "An Expanded Nat with Server Connection Ability," *IEEE Tencon*, 2: 1391-1394 (1999).

(Continued)

*Primary Examiner* — Brian Roberts
(74) *Attorney, Agent, or Firm* — Leydig, Voit & Mayer, Ltd.

(57) ABSTRACT

The present invention relates to a method and an apparatus for providing internal server. The method comprises: matching relevant information carried by a message exchanged between an internal network and an external network with corresponding relationship information between external characteristic information and internal characteristic information of the internal server configured in a mapping table, wherein the external characteristic information comprises an external address and an external port of the internal server, and the internal characteristic information comprises an internal address and an internal port of the internal server; and processing the message according to a matching result. According to the present invention, WEB server and FTP server in the LAN can be easily provided without occupying too much valid IP addresses, thus, the present invention saves limited public IP addresses resource. Furthermore, the present invention implements port-level support to the internal server, and guarantees the security of network equipments.

14 Claims, 3 Drawing Sheets

(56) References Cited

OTHER PUBLICATIONS

Srisuresh et al., IP Network Address Translator (NAT) Terminology and Considerations Status of this Memo, *Network Working Group and IETF*, 1-30 (Aug. 1999) http://www.ietf.orq/rfc.rfc2663.txt.

Srisuresh et al., "Traditional IP Network Address Translator (Traditional NAT)," Network Working Group and IETF, 1-16 (Jan. 2001) http://kaizi.viagente.qc.ca/ietf/rfc/rfc/2022.txt.

Srisuresh et al., "Traditional IP Network Address Translator (Traditional NAT)," Network Working Group and IETF, 1-16 (Jan. 2001) http://kaizi.viagente.gc.ca/ietf/rfc/rfc/3022.txt.

\* cited by examiner

METHOD FOR PROVIDING AN INTERNAL SERVER WITH REDUCED IP ADDRESSES

CROSS-REFERENCE TO RELATED APPLICATIONS

The present application is a continuation-in-part of U.S. patent application Ser. No. 10/420,208, filed on Apr. 22, 2003 and entitled "METHOD FOR PROVIDING AN INTERNAL SERVER WITH REDUCED IP ADDRESSES", which claims priority to Chinese Patent Application No. 02116797.4, filed May 15, 2002, both of which are incorporated hereby by reference in its entirety.

BACKGROUND OF THE INVENTION

1. Field of the Invention

The present invention relates to a network communication technology, particularly to a method for providing an internal server with reduced IP addresses.

2. Background of the Invention

The Net Address Translation (NAT) technology provides a method of accessing Internet with hosts in a Local Area Network (LAN), and the method solves the problem of insufficient IP addresses. Furthermore, the internal hosts in the LAN are invisible to Internet, i.e., hosts in Internet can't proactively access internal hosts in the LAN. For example, there is a host with an IP address 10.110.0.0/24 in an internal LAN and the LAN is connected to Internet via a private line and has a valid public IP address 202.38.160.1 applied through Internet Service Provider (ISP), at this time, all hosts in the LAN can share the IP address 202.38.160.1 to access Internet through NAT technology. However, hosts on Internet are unable to proactively access any internal host in the LAN.

With the development of network technologies, many organizations begin to use private addresses to establish internal LANs. However, some internal hosts in such a LAN are required to store resources and can be accessed by users on Internet, for example, the LAN provides WEB server, in this case, users on Internet can access the hosts providing WEB server in the LAN. Currently, in order to enable users on Internet can access the hosts in the LAN, a typical technology is to configure a "static mapping". For example, a WEB server with an internal address 10.110.0.01 is to be deployed in the LAN, a "static mapping" has to be configured to bind the valid IP address 202.38.160.1 provided through ISP to the IP address 10.110.0.1. Thus, if a host on Internet tries to access the WEB server, it can access the host with internal IP address 10.110.0.1 through accessing the IP address 202.38.160.1. Said method satisfies the requirement for providing an internal server in the LAN, and at the same time, other hosts in the LAN can't access Internet with the valid IP address, which results in waste of the valid public IP address, furthermore, and the LAN can not provide other exterior services (such as Domain Name Server (DNS) or File Transfer Protocol (FTP) server).

Seen from said traditional technology, the method for providing internal server with the static binding address has the following disadvantages:

First, though the method of static binding IP address enables hosts on Internet to access the internal server in the LAN, IP addresses can't be fully used, which results in a waste of limited IP addresses resource.

Second, said scheme has a potential safety hazard: usually the server providing exterior services is for single-use, for example, a WEB server is just used to deliver Hypertext Transfer Protocol (HTTP) service to the external world and the host is only needed to provide the access to port 80. However, if a WEB server is provided in the static binding method, users in external networks can access not only port 80, but also any other port. For example, some server can be maintained through Telnet, such a maintenance can be done only in internal network equipments, however, if static binding address translation method is used, hosts on external networks or Internet can also access the server through Telnet, which brings potential safety hazard for the internal server.

Third, according to traditional technology, internal services can not be provided through non-standard ports of the internal server, for example, if 2 WEB servers should be provided in the LAN and one of them has to use port 8080 instead of port 80, which can not be realized according to traditional technology.

SUMMARY OF THE INVENTION

Object of the present invention is to provide a method and an apparatus for providing internal server with reduced IP addresses, to enable to save IP addresses and guarantee security of the internal server while the internal LAN provides an internal server.

According to an aspect of the present invention, there is provided a method for providing an internal server comprising:

matching relevant information carried by a message exchanged between an internal network and an external network with corresponding relationship information between external characteristic information and internal characteristic information of the internal server configured in a mapping table, wherein the external characteristic information comprises an external address and an external port of the internal server, and the internal characteristic information comprises an internal address and an internal port of the internal server; and processing the message according to a matching result.

According to another aspect of the present invention, there is provided an apparatus for providing an internal server, comprising:

means for matching relevant information carried by a message exchanged between an internal network and an external network with corresponding relationship information between external characteristic information and internal characteristic information of the internal server configured in a mapping table, wherein the external characteristic information comprises an external address and an external port of the internal server, and the internal characteristic information comprises an internal address and an internal port of the internal server; and means for processing the message according to a matching result.

According to another aspect of the present invention, there is provided an apparatus for providing an internal server, comprising:

a mapping table configured with corresponding relationship information between external characteristic information and internal characteristic information of the internal server, wherein the external characteristic information comprises an external address and an external port of the internal server, and the internal characteristic information comprises an internal address and an internal port of the internal server; and a processor configured to match relevant information carried by a message exchanged between an internal network and an external network with the corresponding relationship information, and to process the message according to a matching result According to another aspect of the present invention, there is provided a computer-readable medium having computer-executable instructions stored thereon which, when executed by a computer, will cause the computer to perform the method according to the present invention.

According to another aspect of the present invention, there is provided a computer program product comprising computer-executable instructions which, when executed by a computer, will cause the computer to perform the method according to the present invention.

Seen from the above technical solutions of the present invention, WEB server and FTP server in the LAN can be easily provided without occupying too much valid IP addresses. For example, the WEB server and the FTP server in the LAN are not in the same host and they have different internal private IP addresses, but they can still provide services for the external network via a valid public IP address. The present invention saves limited and valid IP addresses resource and solves the problem of waste of valid public IP addresses resulted from the traditional scheme—providing a static address mapping for each internal server. In addition, the scheme of the present invention implements port-level support to the internal server, enabling users to configure the internal server to provide for external ports and protocols according to their own requirements, for example, through configuring a WEB server, users in external networks can access the WEB server with an internal IP address 10.110.10.10 via the address http://202.110.10.10: 8080, i.e., port 8080 of the internal server.

DETAILED DESCRIPTION OF THE EMBODIMENT

Figure 1:
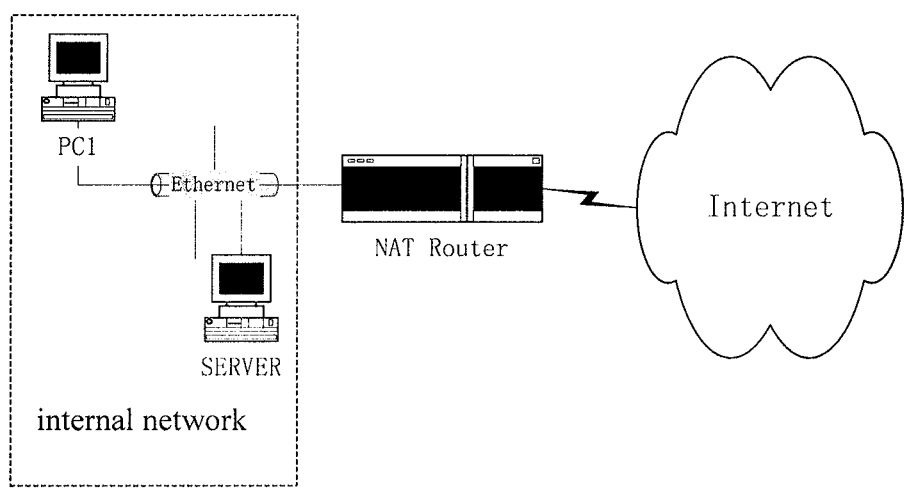
FIG. 1 is an application environment of the present invention.

The application environment is shown in FIG. 1, in which the internal network access Internet via a NAT Router. The internal network includes an internal host PC1 and an internal server SERVER connected through Ethernet. The internal network acquires a valid public IP address from an ISP, and hosts in the internal network can share the public IP address to access Internet. At the same time, according to the present invention, internal server in the internal network can provide exterior services, i.e., external hosts can access the internal server providing exterior services via the valid public IP address. In addition, in order to guarantee the security of the internal server, according to the present invention, external hosts access the ports of the internal server through a designated port, i.e., the internal servers can be configured to provide external services through a specific port.

Figure 2:
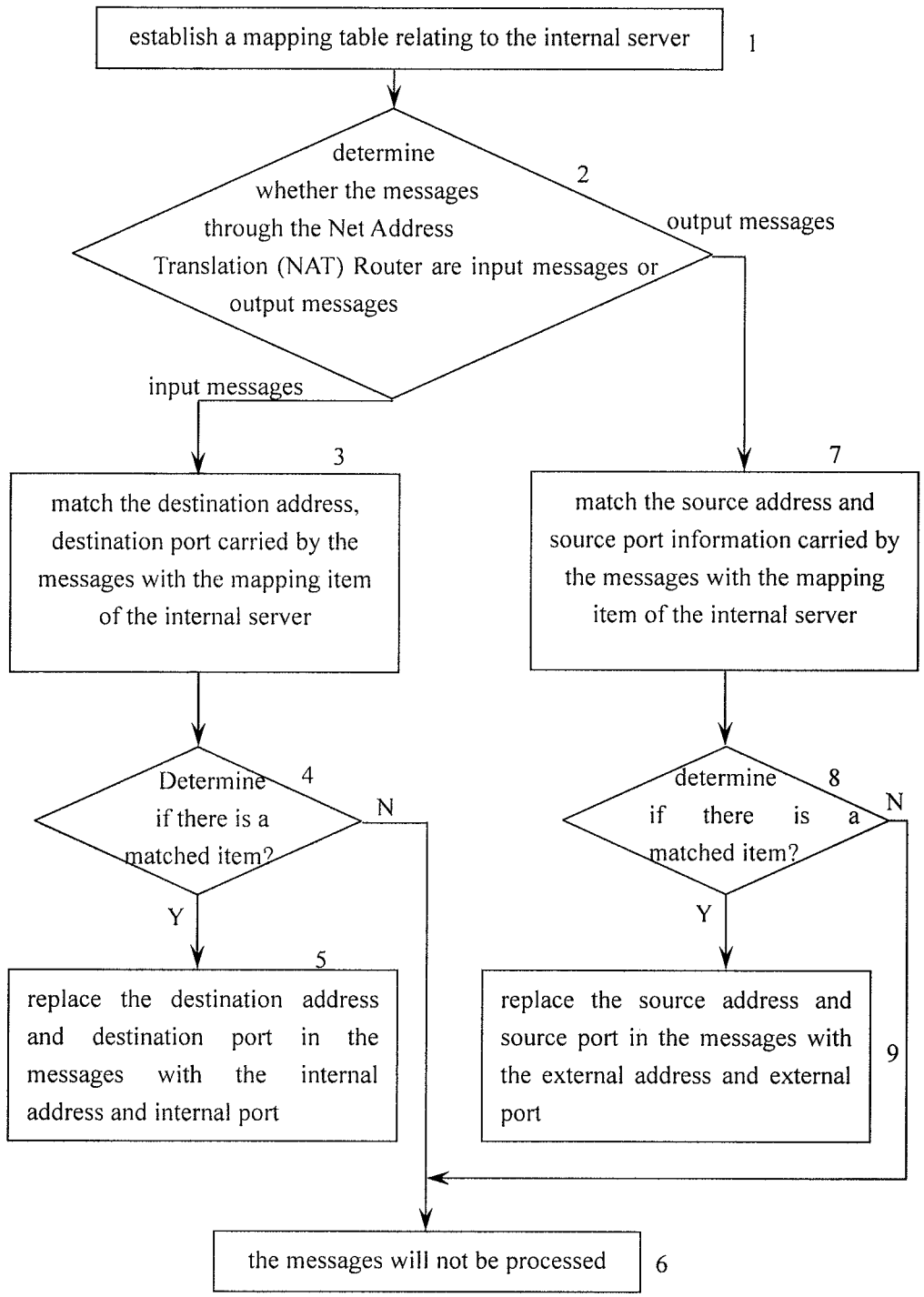
FIG. 2 is the flow chart of the detailed scheme of the present invention.
Figure 3:
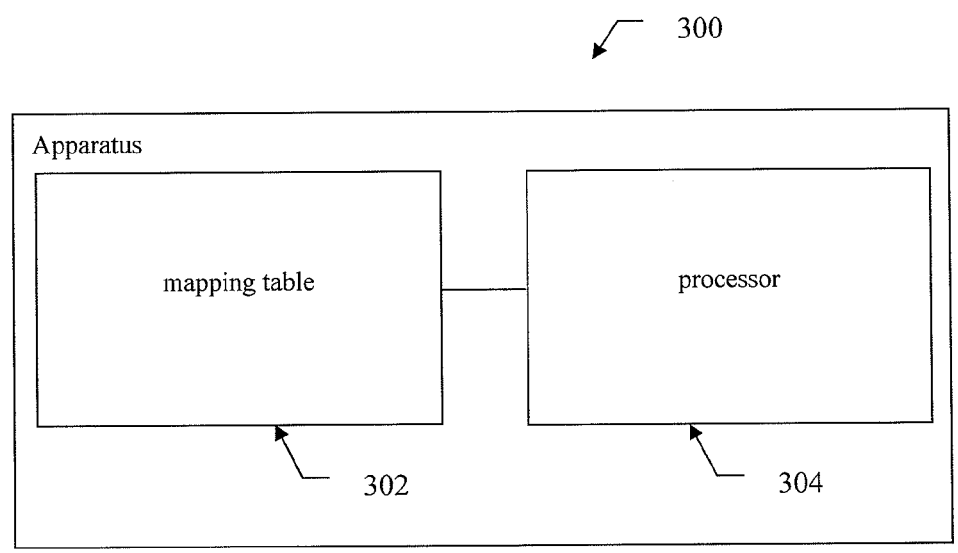
FIG. 3 shows a schematic diagram of an apparatus according to an embodiment of the present invention.

Referring to FIG. 2, the detailed embodiments of the method for providing internal server with reduced IP addresses according to the present invention is described as the following:

first, the user should configure the external address, external port, and external protocol code of an internal server as well as the internal address, internal port, and internal protocol code of the internal server on the NAT Router, and should establish a mapping table relating to the internal server according to the configured parameter, referring to step 1, to enable external hosts to access the internal server through the valid public IP address of the internal network and the port providing exterior services of the internal server Then, match the relevant information carried by the input messages and the output messages with the configured corresponding relationship information, comprising:

first, determine whether the messages through the Net Address Translation (NAT) Router are input messages or output messages, referring to step 2, wherein:

if the input messages, match the destination address, destination port, and protocol code carried by the messages with the external address, external port, and external protocol code in the mapping table of the internal server, referring to step 3, and determine whether there is a matched item in the mapping table of the internal server, referring to step 4, if yes, it indicates that the messages received are input messages, process to step 5; otherwise the messages will not be processed, referring to step 6. In addition, if there are not messages matching with the relevant information in the mapping table of the internal server, the messages can be handed over to other modules to process;

if they are output messages, match the source address, source port, and source protocol code with the internal address, internal port, and internal protocol code configured, referring to step 7, and determine whether there is a matched item in the mapping table of the internal server, referring to step 8, if yes, it indicates that the messages are output messages, process to step 9; otherwise the messages will not be processed, referring to step 6, and the messages can be handed over to other modules to process.

Last, process the messages correspondingly according to the matching result, wherein:

for the input messages, for the matched message, replace the destination address and destination port in the messages with the internal address and internal port corresponding to the external address and external port matching with the relevant information of the message in the mapping table of the internal server, referring to step 5, and then forward the message, thus, the internal server with an internal address can receive messages from outside correctly For the output messages, replace the source address and source port in the messages with the external address and external port corresponding to the internal address and internal port matching with the relevant information of the messages, referring to step 9, and then forward the message, thus, output messages can be forwarded normally.

According to the present invention, because that the valid public IP address acquired from an ISP is not bound to a private IP address of the internal network statically, other hosts in the network can also access Internet via said public IP address. At the same time, through configuring the mapping table of the internal server correctly, the ports providing exterior services of the internal server can be designated to guarantee security of the internal server. In conclusion, only messages matching with relevant information in the address mapping table can be exchanged between the internal server in internal network and external hosts, thus invalid access to internal server from external hosts are prohibited.

Furthermore, it is obvious that the operation procedure of the method according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device, and then reading out and executing the program codes by a processor such as central processing unit (CPU) of the system or device.

At this time, as long as the system or device has a function of executing a program, implementing modes of the present invention are not limited to the program, and the program can be in any form of, for example, an object program, program executed by an interpreter, or script program provided to an operating system, etc.

The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a computer by downloading the computer program codes according to the present invention from the Internet, and installing the same into the computer and then executing the program codes.

Although the embodiments of the present invention have been described in detail with reference to the accompanying drawings, it should be noted that, these embodiments are only used to illustrate the present invention but not to limit the present invention. Various modifications and changes can be made by those skilled in the art without departing from the spirit and scope of the present invention. Therefore, the scope of the present invention is only defined by the appended claims and the equivalents thereof.

What is claimed is:

1. A method implemented by a routing apparatus for allowing a device in an external network to access proactively an internal server in an internal network, wherein the internal network accesses the external network via the routing apparatus, the internal network comprises an internal host and the internal server, the internal host uses a public Internet protocol (IP) address to access the external network, the device in the external network accesses the internal server via the public IP address, the method comprising:
    receiving, by the routing apparatus, a message exchanged between the internal network and the external network;
    matching, by the routing apparatus, relevant information carried in the message with corresponding relationship information between external characteristic information and internal characteristic information of the internal server configured in a mapping table, wherein the mapping table is established according to a parameter configured by a user, the parameter configured by the user comprises an external address, an external port of the internal server, an internal address and an internal port of the internal server, the external characteristic information comprising the external address and the external port of the internal server, the external address being the public IP address, the internal characteristic information comprising the internal address and the internal port of the internal server; and
    processing, by the routing apparatus, the message according to a matching result.

2. The method according to claim 1, wherein the routing apparatus is a Network Address Translation (NAT) Router.

3. The method according to claim 1, wherein the matching process comprises:
    determining whether the message is an incoming message from the external network to the internal network or an outgoing message from the internal network to the external network;
    if the message is the incoming message, matching a destination address and a destination port carried in the message with the external address and the external port in the corresponding relationship information; and
    if the message is the outgoing message, matching a source address and a source port carried in the message with the internal address and the internal port in the corresponding relationship information.

4. The method according to claim 3, wherein if the message is the incoming message, the processing process comprises:
    determining whether there is a matching item in the corresponding relationship information of the internal server; and
    if there is a matching item, replacing the destination address and the destination port in the message with the internal address and the internal port corresponding to the external address and the external port in the matching item.

5. The method according to claim 3, wherein if the message is the outgoing message, the processing process comprises:
    determining whether there is a matching item in the corresponding relationship information of the internal server; and
    if there is a matching item, replacing the source address and the source port in the message with the external address and the external port corresponding to the internal address and the internal port in the matching item.

6. The method according to claim 1, wherein the external characteristic information further comprises an external protocol code of the internal server, and the internal characteristic information further comprises an internal protocol code of the internal server, and
    wherein the matching process comprises:
    determining whether the message is an incoming message from the external network to the internal network or an outgoing message from the internal network to the external network;
    if the message is the incoming message, matching a destination address, a destination port, and a protocol code carried in the message with the external address, the external port and the external protocol code in the corresponding relationship information; and
    if the message is the outgoing message, matching a source address, a source port, and a protocol code carried in the message with the internal address, the internal port and the internal protocol code in the corresponding relationship information.

7. The method according to claim 1, wherein the external network comprises Internet.

8. An apparatus for allowing a device in an external network to access proactively a server in an internal network, wherein the internal network accesses the external network via the apparatus, the internal network comprises a host and the server, the host uses a public Internet protocol (IP) address to access the external network, the device in the external network accesses the server via the public IP address, the apparatus comprising:
    memory configured to store a mapping table, wherein the mapping table comprises a corresponding relationship between external characteristic and internal characteristic of the server, wherein the mapping table is established according to a parameter configured by a user, the parameter comprises an external address, an external port of the server, an internal address and an internal port of the server, the external characteristic comprises the external address and the external port, the external address being the public IP address, the internal characteristic comprises the internal address and the internal port; and a processor configured to match relevant information carried in a message exchanged between the internal network and the external network with the corresponding relationship included in the mapping table, and to process the message according to a matching result.

9. The apparatus according to claim 8, wherein the external characteristic further comprises an external protocol code of the server, and the internal characteristic further comprises an internal protocol code of the server.

10. A computer program product comprising non-transitory storage medium storing computer-executable instructions which, when executed by a computer acting as a routing apparatus, cause the computer to allow a device in an external network to access proactively an internal server in an internal network, wherein the internal network accesses the external network via the routing apparatus, the internal network comprises an internal host and the internal server, the internal host uses a public Internet protocol (IP) address to access the external network, the device in the external network accesses the internal server via the public IP address, the computer-executable instructions comprising:

instructions for causing the routing apparatus to receive a message exchanged between the internal network and the external network;

instructions for causing the routing apparatus to match relevant information carried in the message with corresponding relationship information between external characteristic information and internal characteristic information of the internal server configured in a mapping table, wherein the mapping table is established according to a parameter configured by a user, the parameter configured by the user comprises an external address, an external port of the internal server, an internal address and an internal port of the internal server, the external characteristic information comprising the external address and the external port of the internal server, the external address being the public IP address, the internal characteristic information comprising the internal address and the internal port of the internal server; and instructions for causing the routing apparatus to process the message according to a matching result.

11. The method according to claim 1, wherein the internal server is configured to provide an external service through a specific port.

12. A method, implemented by a routing apparatus, for allowing a device in an external network to access, proactively, a server in an internal network, wherein the access to the server is via a public Internet protocol (IP) address, the method comprising:

receiving, by the routing apparatus, a message from the device, wherein the message carries a destination address and a destination port;

matching, by the routing apparatus, the destination address and the destination port with external characteristics in a mapping table;

determining whether there is a matching item in the mapping table; and if there is, in the mapping table, a matching item that includes an internal address and an internal port of the server, replacing the destination address and the destination port carried in the message with the internal address and the internal port in the matching item;

wherein the mapping table comprises corresponding relationships between external characteristics of the server and internal characteristics of the server, the external characteristics of the server comprise an external address and an external port of the server, the external address of the server being the public IP address, and the internal characteristics of the server comprise the internal address and the internal port of the server, wherein the mapping table is established according to a parameter configured by a user of the routing apparatus, the parameter comprises the external address, the external port of the server, the internal address and the internal port of the server.

13. The method according to claim 12, wherein the external characteristics further comprise an external protocol code of the server, and the internal characteristics further comprise an internal protocol code of the server, and wherein the replacing process comprises:

replacing the destination address, the destination port and the protocol code carried in the message with the internal address, the internal port and the internal protocol code in the matching item.

14. A computer program product comprising non-transitory storage medium storing computer-executable instructions which, when executed by a computer acting as a routing apparatus, cause the computer to allow a device in an external network to access proactively a server in an internal network, wherein the device in the external network accesses the server via a public Internet protocol (IP) address, the computer-executable instructions comprising:

instructions for causing the routing apparatus to receive a message from the device in the external network, wherein the message carries a destination address and a destination port;

instructions for causing the routing apparatus to match the destination address and the destination port with external characteristics in a mapping table, instructions for causing the routing apparatus to determine whether there is a matching item in the mapping table; and instructions for causing the routing apparatus in response to the determination that there is, in the mapping table, a matching item that includes an internal address and an internal port of the server, to replace the destination address and the destination port carried in the message with the internal address and the internal port in the matching item;

wherein the mapping table comprises corresponding relationships between external characteristics of the server and internal characteristics of the server, the external characteristics of the server comprise an external address and an external port of the server, the external address of the server being the public IP address, and the internal characteristics of the server comprise the internal address and the internal port of the server, wherein the mapping table is established according to a parameter configured by a user of the routing apparatus, the parameter comprises the external address, the external port of the server, the internal address and the internal port of the server.

* * * * *